Patented July 11, 1933

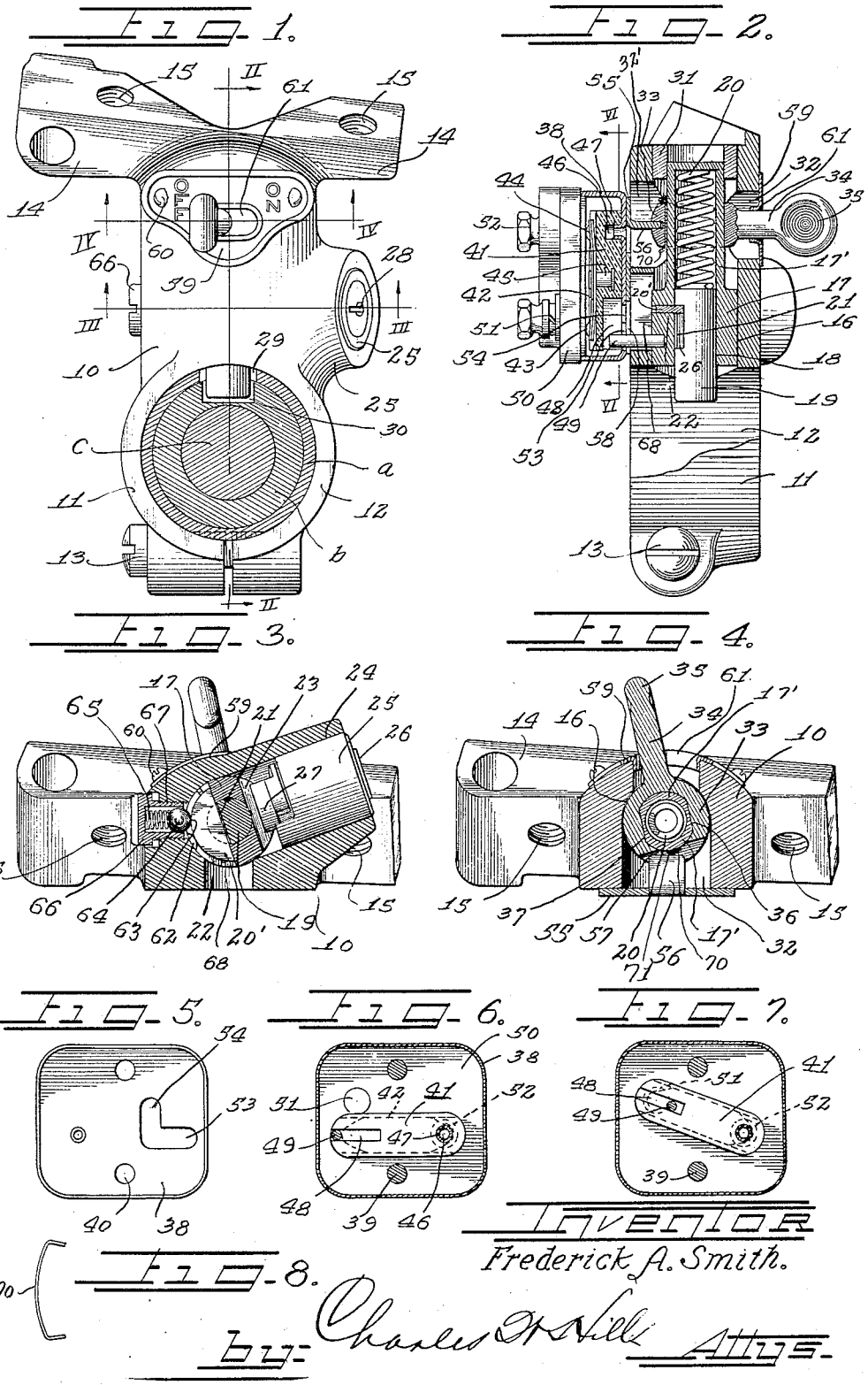

1,917,608

UNITED STATES PATENT OFFICE

FREDERICK A. SMITH, OF NORTH CHICAGO, ILLINOIS, ASSIGNOR TO OAKES PRODUCTS CORPORATION, OF NORTH CHICAGO, ILLINOIS, A CORPORATION OF MICHIGAN

AUTOMOBILE LOCK

Application filed December 21, 1931. Serial No. 582,314.

This invention relates to an improved lock for the steering and ignition circuit of an automobile and concerns particularly a lock in which a key reciprocated locking bolt controls the locking or unlocking of the steering and a lever controls the oscillation of the locking bolt for actuation thereby of switch mechanism connected with the ignition circuit, and the object is to produce a compact lock structure whose various cooperating parts are so constructed and arranged that assembly or separation is facilitated and the cost of manufacture materially reduced.

The various features of the invention are incorporated in the structure disclosed on the drawing, in which drawing Figure 1 is a plan view of the lock structure;

Figure 2 is a section on plane II—II of Figure 1;

Figure 3 is a section on plane III—III of Figure 1;

Figure 4 is a section on plane IV—IV of Figure 1;

Figure 5 is a plan view of the switch mechanism housing;

Figure 6 is a section on plane VI—VI of Figure 2 showing the switch in open position;

Figure 7 is a section similar to Figure 6 showing the switch in closed position; and Figure 8 is a side view of a lost motion take-up spring.

The lock structure shown comprises a body 10 having at its outer end the semi-annular extensions 11 and 12 for receiving the steering column A of an automobile to which the extensions are clamped as by means of a screw or bolt 13. At its inner end the body 10 has the lateral extensions 14 having threaded apertures 15 by means of which the lock structure may be secured to a suitable support as for example the dash board of the automobile.

The body 10 has the longitudinal cylindrical bore 16 for receiving the locking bolt 17, the inner section 17' of this bolt being of reduced diameter. The bolt has the longitudinal cylindrical pocket 18 for the locking bar 19 and a spring 20, the spring tending to shift the bar outwardly. To limit the movement of the locking bar a stop in the form of a plate 20' extends into the longitudinal slot 21 in the bar, the plate being inserted in a transversely extending slot 22 in the locking bolt and may be confined in the slot by burring over the metal at the outer edges of the slot.

On the side of the bolt 17 opposite to the slot 22, the bolt has the transverse slot 23 which registers with the cylindrical passage 24 extending laterally through the body 10 and the extension 25 thereon. This passageway 24 receives a lock cylinder 25 whose barrel 26 terminates at its inner end in a cam 27 arranged eccentrically relative to the barrel axis, and this cam extends into the slot 23 of the locking bolt so that when the lock barrel is turned by means of a suitable key applied in the keyhole 28, the lock bolt will be shifted axially. The extent of rotation of the lock barrel is 180° so that at the ends of the lock operation the bolt will be locked in either its inner or outer position by the cam 27.

When the locking bolt is shifted outwardly by turning of the key the lock bar 19 will extend through the passageway 29 in the stationary steering column A and into the notch 30 in the collar B secured to the steering shaft C, and the steering of the automobile will be locked. If the steering wheel is not in the proper position (usually neutral position) when the lock bolt is shifted inwardly, the lock bar 19 will be held by the spring 20 against the cylindrical face of the collar B and then when the steering wheel is brought around to proper position for registration of the notch 30 with the passageway 29, the locking bar will be projected by the spring into the notch and steering will be locked.

Secured in the inner end of the bore 16 is a bushing 31 for receiving the reduced end section 17' of the locking bolt. This bushing may be of a suitable bearing metal for reducing the friction and the bushing may have a driving fit so as to securely lock itself in position, the outer end thereof being substantially flush with the adjacent end of the lock structure body 10.

At its inner end the body 10 has the transversely extending passageway 32 which intersects the bore 16 and receives a lever structure for operating the locking bolt, this lever structure comprising the hub 33 and the arm 34 extending therefrom and terminating in a flattened preferably circular shaped end 35 against which the fingers may be applied for readily swinging the lever structure. Key projections 36 on the hub engage the slabbed or flat sides 37 of the locking bolt section 17' so that swinging of the lever structure will rotate the locking bolt, such rotation controlling the operation of the switch mechanism which will now be described.

The switch mechanism comprises a rectangular sheet metal housing 38 mounted against the rear side of the lock structure body 10 preferably by screws 39 extending through openings 40 in the base of the housing 38 and threading into the body 10. An oblong switch block 41 of suitable insulating material has secured on its rear side a switch blade 42 having the contact deflections or knobs 43 and 44 at its ends, the blade being shown secured by means of a rivet or pin 45 engaging the blade midway between its ends so that the ends may flex. In its front side and at its inner end the switch block has the cylindrical hole 46 for receiving a pivot support 47 which may be formed by deflecting inwardly a section of the bottom of the housing 38. In its front side and at the outer end thereof the switch block has the longitudinally extending slot or channel 48 for receiving a pin 49 secured to and extending radially from the locking bolt 17 at the outer end thereof so that rotation of the locking bolt will result in swing of the switch block about the pivot projection 47, the body 10 having the clearance passage 68 for the pin.

The end of the housing 38 is closed by a plate 50 of insulating material which plate may be held by the screws 39 which hold the housing in position on the body 10. The plate carries terminal posts 51 and 52 whose inner ends are flush with the inner face of the plate 50 for engagement by the switch blade knobs 43 and 44, the posts forming the terminals of the ignition circuit for the automobile to which the lock structure is applied. The post 52 is located so that the switch blade end 44 is always in contact therewith but the post 51 is offset a distance laterally away from the contact end 43 of the switch blade when the switch block is parallel with the axis of the locking bolt so that at this time the ignition circuit will be opened. Upon rotation of the locking bolt the switch block will be rotated to bring the contact end 43 of the switch blade into engagement with the post 51 to cause closure of the ignition circuit. The open position of the switch is indicated in Figure 6 and the closed position is indicated in Figure 7.

In the base of the switch housing 38 is an L-shaped slot comprising the longitudinally extending section 53 and the section 54 extending transversely of the inner end of the longitudinal section. The pin 49 extends through this slot and while the pin is in the longitudinal section rotation of the locking bolt by the lever 34 is prevented so that when the locking bolt is in its outer or steering locking position it is held against rotational movement. When the bolt is shifted inwardly to steering unlocking position the pin 49 will come into register with the transverse slot 54 and then the locking bolt may be rotated by swinging of the lever. While the pin 49 travels through the longitudinal slot 53 and through the longitudinal groove 48 of the switch block 41, the switch block will be held in its circuit opening position, but when the block is rotated by the pin during travel of the pin through the transverse slot 54 the switch block will be rotated to close the ignition circuit, so that closure of the ignition circuit can be effected only after the locking bolt has been shifted to unlocking position, and conversely, the locking bolt cannot be shifted back into locking position until it is rotated to withdraw its pin from the transverse slot 54 so that the ignition circuit must be opened before the bolt can be shifted to steering locking position.

To hold the lever 34 against axial movement a plate 55 is preferably provided which is interposed between the housing 38 and the lock structure body 10 and held in position by the same bolts 39 which secure the housing and its closure plate 50. The plate has a tongue 56 deflected at right angles therefrom for engaging in the slot 57 in the hub 33 of the lever structure so that the lever structure may be swung to rotate the locking bolt but will be held against axial displacement while the locking bolt is shifted to locking or unlocking position. The plate has the slot or opening 58 therein forming a clearance passageway for the pin 49.

The tongue 56 on the plate 55 extends into the rear end of the transverse passageway 32, and the front end of this passageway is covered by an escutcheon plate 59 detachably secured by screws 60, this plate having the slot 61 for receiving the lever arm 34, the width of this slot being substantially the width of the arm so that the escutcheon plate will assist the tongue 56 in holding the lever against axial displacement. The escutcheon plate has the indications "off" and "on" thereon for indicating the condition of the ignition circuit. As shown in Figure 1, when the locking bolt is in steering locking position the lever is at the left end of the slot adjacent to the indication "off" to indicate that the ignition circuit is open. After shifting outwardly of the locking bolt to steering unlocking position by turning of the key in the lock 25, the lock bolt will be free for rotational movement and then swing of the lever toward the right will cause closure of the ignition switch and the lever will be adjacent to the "on" indication to indicate to the driver that the ignition circuit is on or closed.

To yieldingly lock the locking bolt in its alternate positions of circuit control the outer end thereof has the adjacent longitudinally extending grooves 62 and 63 into which a ball 64 is yieldingly projected by a spring 65 in a plug 66 having screw threaded connections in the passageway 67 through the body 10, this arrangement giving a snap action to the locking bolt when it is rotated. The engagement of the ball in the grooves also assists the pin 49 in keeping the locking bolt in alignment during reciprocatory movement thereof while locking or unlocking the steering.

A resilient member such as a spring 70 is preferably inserted between the hub of the lever 34 and the end 17' of the locking bolt to take up wear and any lost motion so that the bolt may readily slide through the hub but rattling will be prevented. The spring is U-shape with its yoke primarily convex and when the spring is inserted the yoke will be flexed and its spring reaction will hold the lever against loose motion, the ends of the spring extending along the sides of the hub to hold the spring in operative position. The spring is of comparatively thin material and is preferably inserted in a channel 71 in the slotted side of the lever hub so that it will hold the lever in radial alinement relative to the locking bolt.

The diameter of the lower end 32' of the transverse passageway 32 is such that the hub 33 of the lever 34 will readily pass therethrough, but the upper end of the passageway is of smaller diameter to prevent passageway of the lever hub therethrough but to permit ready passage therethrough of the finger engaging end 35 of the lever. To assemble the structure the locking bolt is inserted into the rear end of the bore 16 and is then shifted forwardly until its reduced end clears the transverse passageway 32. The lever 34 is then inserted through the end 32' of the passageway 32 to bring its hub into position to receive the reduced end of the bolt, the take-up spring 70 being first inserted in channel 71, and then the bolt is shifted rearwardly with its reduced end extended through the lever hub, and then the bearing bushing 31 is secured in the rear end of the bore 16. The pin 49 is then secured to the front end of the locking bolt and the plate 55 and the switch structure are mounted in place with the tongue 56 extending into the slot 57 of the lever hub. The escutcheon plate 59 is then applied and secured, and the lock 25 is inserted and secured in place. By bringing the bolt oscillating lever within the body 10 a very compact arrangement results.

I have shown a practical and efficient embodiment of the various features of my invention, but I do not desire to be limited to details shown and described as changes and modifications may be made without departing from the scope of the invention as outlined in the appended claims.

I claim as follows:

1. In a lock structure, the combination of a body having a longitudinally extending bore, a locking bolt mounted in said bore to be guided thereby for reciprocatory movement and oscillatory movement, means for reciprocating said bolt for locking or unlocking movement thereof, said body having a transverse passageway intersecting said bore, a lever operable in said transverse passageway and extending to the exterior of said body for manipulation to control the oscillatory movement of said bolt, and control means actuated when said bolt is oscillated.

2. A lock in which is combined a locking bolt, an electrical switch, means for shifting said bolt axially locking or unlocking position without operation of said switch, said bolt being rotatable only when in unlocking position, means responsive to rotation of said bolt to actuate said switch for circuit controlling operation, and an actuating member, said bolt being connected with said actuating member for rotation thereby but being free to shift independently thereof, said connection including a resilient member for taking up lost motion.

3. A lock in which is combined a bolt, an electrical switch, means for shifting said bolt into locking or unlocking position without operation of said switch, means whereby said bolt is rotatable only when in unlocking position, a connection responsive to rotation of said bolt to actuate said switch for circuit controlling operation, an actuating lever fulcrumed concentric with said bolt, said bolt being shiftable to locking or unlocking position independently of movement of said lever, and a connection between said lever and bolt whereby swing of said lever will rotate said bolt, said connection between said lever and bolt including resilient means for preventing lost motion.

4. A lock in which is combined a locking bolt, an electrical switch, means for shifting said bolt axially into locking or unlocking position, said bolt being rotatable only when in unlocking position, means responsive to rotation of said bolt to actuate said switch for circuit controlling operation, a lever having a hub through which said bolt is slidable during shifting movement thereof, a connection whereby swing of said lever will rotate said bolt, and resilient means included in said connection for intimately holding said lever against lost motion.

5. A lock in which is combined a locking bolt, an electrical switch, means for shifting said bolt axially into locking or unlocking position, said bolt being rotatable only when in unlocking position, means responsive to rotation of said bolt to actuate said switch for circuit controlling operation, a lever having a hub through which said bolt is slidable during shifting movement thereof, means holding said lever against movement with said bolt during shifting thereof, and a connection whereby swing of said lever will rotate said bolt, said connection including take-up means for preventing rattling of said lever.

6. In a lock, the combination of a body having a longitudinally extending bore, a locking bolt mounted in said bore to be guided thereby for reciprocatory movement and oscillatory movement, the inner end of said bolt being of reduced width and a bushing at the inner end of said bore forming a guide for said reduced end of the bolt, a lever receiving the reduced end of said bolt, means for holding said lever against lateral movement but permitting swinging movement thereof, said bolt being slidable in said lever, means for reciprocating said bolt for locking or unlocking movement thereof, a switch, and means whereby swinging of said lever will operate said switch.

7. In a lock, the combination of a body having a longitudinal bore therethrough, a locking bolt guided in said bore for axial shift and for rotary movement, means for reciprocating said bolt to locking or unlocking position, a transverse passageway through said body intersecting said bore, a lever in said transverse passageway receiving said bolt, a connection whereby swing of said lever will rotate said bolt but permitting sliding movement of said bolt relative to said lever, switch mechanism and a support therefor on said body, a tongue extending from said switch support and engaging said lever to prevent lateral movement thereof during reciprocation of said bolt, and means whereby swing of said lever will actuate said switch mechanism.

8. A lock structure comprising a body having a longitudinally extending bore, a locking bolt guided in said bore for axial shift and for rotary movement, said body having a transverse passageway, a lever in said transverse passageway having a hub receiving said bolt, means for shifting said bolt to locking or unlocking position, an escutcheon plate forming a guide for said lever, a tongue engaging the lever hub, said plate and tongue preventing lateral movement of said lever but permitting swing thereof, a connection between said lever and bolt whereby swing of the lever will rotate the bolt, said connection including a resilient lost motion take-up means, a switch, and a connection whereby swing of the lever will operate the switch.

9. A lock comprising a locking bolt adapted for axial reciprocation and for rotational movement, a lever receiving the locking bolt and adapted only for swinging movement, means for shifting said bolt to locking or unlocking position, a connection transmitting swing of the lever to the bolt for rotary movement thereof, a lost motion take-up spring included in said connection, switch mechanism, and a connection translating the swing of said lever into operation movement of said switch mechanism.

10. In a lock, the combinaton of a body having a longitudinal bore, a locking bolt mounted in said bore for reciprocatory movement and oscillatory movement therein, the inner end of said bolt being of reduced width and a bushing at the inner end of said bore receiving said reduced end to assist in guiding said bolt, said body having a transverse passage, a lever in said transverse passage connected with the reduced end of said bolt and extending to the exterior of said body for manipulation to control the oscillatory movement of said bolt, and automotive controlling means operated by the manipulation of said lever.

11. In lock structure, the combination of a body having a longitudinal bore therethrough, a locking bolt guided in said bore for axial shift and for rotary movement, means for reciprocating said bolt to locking or unlocking position, a lever receiving said bolt, a connection whereby swing of said lever will rotate said bolt and will permit sliding movement of said bolt relative to said lever, switch mechanism and a supporting plate therefor on said body, an extension on said plate engaging said lever to prevent lateral movement thereof during reciprocation of said bolt, and means whereby swing of said lever will actuate said switch mechanism.

12. A lock in which is combined a locking bolt, an electrical switch, means for shifting said bolt axially into locking or unlocking position without operation of said switch, said bolt being rotatable only when in unlocking position, means responsive to rotation of said bolt to actuate said switch for circuit controlling operation, and an actuating member, said bolt being connected with said actuating member for rotation thereby but being free to shift independently thereof.

13. A lock comprising a locking bolt adapted for axial reciprocation and for rotational movement, a lever receiving the locking bolt and adapted only for swinging movement, means for shifting said bolt to locking or unlocking position, switch mechanism, and a connection transmitting the swing of said lever into operation movement of said switch mechanism, said connection including said locking bolt.

14. A lock in which is combined a locking bolt, an electrical switch, means for shifting said bolt into locking or unlocking position, a lever having a hub through which said bolt is slidable during shifting movement thereof, means holding said lever against movement with said bolt during shifting thereof, and a connection whereby swing of said lever will cause operation of said switch, said connection including said bolt.

15. A lock structure comprising a housing having a longitudinal passageway therethrough, a lock bolt element movable in axial direction in said passageway, a bushing in the inner end of said passageway for guiding the inner end of said lock bolt element, a switch, an actuating element in said housing adapted when rotated to operate said switch, and locking means for locking said actuating element to said housing to prevent rotational movement thereof when said lock bolt element is in locking position and to release said actuating element for rotation when said lock bolt element is in unlocking position and to prevent return movement of said lock bolt element to locking position while said actuating element is being rotated to operate said switch.

In testimony whereof I have hereunto subscribed my name at North Chicago, Lake County, Illinois.

FREDERICK A. SMITH.